United States Patent
Chedsey et al.

(10) Patent No.: US 11,681,307 B1
(45) Date of Patent: Jun. 20, 2023

(54) SYSTEMS AND METHODS FOR FUEL-GAS BLENDING

(71) Applicant: Digital Stream Energy, Inc., Boston, MA (US)

(72) Inventors: George Chedsey, Greenwood Village, CO (US); Edgar S. Trotter, III, Highlands Ranch, CO (US); Richard Zemcik, San Antonio, TX (US)

(73) Assignee: Digital Stream Energy, Inc., Boston, MA (US)

( * ) Notice: Subject to any disclaimer, the term of this patent is extended or adjusted under 35 U.S.C. 154(b) by 0 days.

(21) Appl. No.: 17/743,519

(22) Filed: May 20, 2022

(51) Int. Cl.
  *G05D 11/13* (2006.01)
  *G05D 16/00* (2006.01)
  *E21B 43/295* (2006.01)

(52) U.S. Cl.
  CPC .......... *G05D 11/139* (2013.01); *E21B 43/295* (2013.01); *G05D 16/024* (2019.01); *Y10T 137/2499* (2015.04)

(58) Field of Classification Search
  CPC ......... Y10T 137/0346; Y10T 137/2499; E21B 21/062; E21B 43/295; G05D 11/132; G05D 11/139
  USPC ...................................................... 137/6, 88
  See application file for complete search history.

(56) References Cited

U.S. PATENT DOCUMENTS

| | | | | |
|---|---|---|---|---|
| 2,072,384 | A * | 3/1937 | Schmidt ............... | G05D 11/132 137/83 |
| 10,018,027 | B2 * | 7/2018 | Graney, IV ............. | C10L 3/101 |
| 11,149,905 | B2 * | 10/2021 | Wang .................... | F17C 11/007 |
| RE49,083 | E * | 5/2022 | Case ...................... | E21B 43/40 |
| 2005/0132713 | A1 * | 6/2005 | Neary ..................... | F02C 6/04 60/784 |
| 2006/0263283 | A1 * | 11/2006 | Egan ....................... | B01F 23/19 423/210 |
| 2010/0289270 | A1 * | 11/2010 | Behrens ................. | C10B 53/00 201/1 |
| 2016/0115101 | A1 * | 4/2016 | Yanez ..................... | C07C 7/04 585/800 |
| 2017/0254188 | A1 * | 9/2017 | Graney, IV .......... | B01D 46/448 |
| 2020/0339889 | A1 * | 10/2020 | Mechler ................. | C07C 7/14 |
| 2021/0255162 | A1 * | 8/2021 | Rady .................... | G05D 11/132 |

* cited by examiner

*Primary Examiner* — William M McCalister
(74) *Attorney, Agent, or Firm* — Oliver Strimpel

(57) ABSTRACT

A fuel-gas blending system receives low-pressure tank vapors and high-pressure flash gases from an oil production facility, boosts the pressure of the tank vapors, and blends the tank vapors and high-pressure gases together to supply fuel gas at a pressure and quality required by an onsite fuel-gas-powered generator. The quality of the supplied fuel gas is maintained by controlling the proportion of a high-pressure gas, such as separator gas, in the blend while the volumetric flow rates of the various gases vary in response to the real-time demands of the generator. The system operates in one of multiple modes in order to maximize the use of tank vapors. In one mode, all the gases pass through a low-pressure blower. In another mode, only the tank vapors pass through the blower, and the high-pressure gases are blended with tank vapors downstream of the blower.

21 Claims, 4 Drawing Sheets

SYSTEMS AND METHODS FOR FUEL-GAS BLENDING

BACKGROUND

In many oil production facilities, associated gases are produced along with the oil. Since the gas has a lower economic value than the oil, the only economically feasible mode of take-away is with a pipeline. Many remote well locations, however, have limited or no pipeline infrastructure. As a result, oil-well operators vent or flare, compress, or liquify these byproduct gases. Flaring and venting represent a waste of a potential energy source and have an adverse environmental impact. Vented gas can accumulate around the well bore, creating safety hazards, while flaring generates greenhouse gases. Such gases are commonly referred to as stranded gases.

If such gases are used to generate electricity, it may not be feasible to feed the electricity into the grid since electrical infrastructure may also be lacking. In addition, the gases produced by oil wells vary greatly in their heating value, pressure, and volumetric flow rates. For example, a typical oil production facility may generate high-BTU tank vapors at 1-8 ounces per square inch (OZ), low-BTU gas from separators at 100 pounds per square inch gauge (PSIG), and intermediate-BTU gas from heater treaters at 20 PSIG.

One way of utilizing stranded natural gases that overcomes these challenges is to use them for the onsite generation of electricity to supply an onsite energy-consuming application. One such application is the mining of cryptocurrency, such as Bitcoin, for which demand is increasing rapidly. To generate the electricity, generators with gas-fueled engines or turbines are deployed. But in order to operate safely and efficiently, such generators require a relatively constant supply and quality of fuel gas that can meet their various requirements. In particular, generator manufacturers specify a required range of generator fuel-gas inlet pressure, BTU content, and dew point.

There is therefore a need for a system that is able to input fuel gases from multiple sources at an oil production facility, including gases with disparate pressures, flow rates, and composition, to provide a fuel-gas supply suitable for the steady, economic, and safe operation of electric generators.

SUMMARY

In general, fuel gas from multiple sources at an oil production facility is blended to provide fuel gas at the pressure and quality required by electrical generators. The multiple sources include low-pressure tank vapors and higher-pressure gases, such as separator gas and heater treater gas.

In general, in a first aspect, a method of supplying fuel gas to a fuel-gas-powered generator, the fuel gas comprising a blend of flash gases produced by an oil production facility, comprises: receiving from the oil production facility: tank vapors having a first pressure; and separator gas having a second pressure, wherein the second pressure is greater than the first pressure; and in a first mode: blending the tank vapors and the separator gas; supplying the blended gas to an inlet of a blower at a specified third pressure that is lower than the first pressure; supplying the blended gas from an outlet of the blower to an inlet of the generator; and wherein: a speed of the blower is responsive to a time-varying fuel-gas demand of the generator such that a specified pressure at the inlet of the generator inlet is maintained; a volumetric flow rate of the separator gas is controlled to maintain the separator gas at a specified percentage of the blended gas; and a volumetric flow rate of the tank vapors is controlled to maintain the specified third pressure at the inlet of the blower; in a second mode: supplying the tank vapors to the inlet of the blower; blending the separator gas with the tank vapors at a first location downstream of the blower; supplying the blended gas to the inlet of the generator; and wherein: the speed of the blower is controlled to maintain a specified fourth pressure at the output of the blower; and the volumetric flow rate of the separator gas is controlled to maintain the separator gas at the specified percentage of the blended gas while controlling a volumetric flow rate of the blended gas to maintain the specified generator inlet pressure; operating in the first mode when the received tank vapors are insufficient to maintain the specified third pressure at the inlet to the blower; and operating in the second mode when the received tank vapor is sufficient to maintain the specified third pressure at the inlet to the blower.

Various embodiments include one or more of the following features. The first pressure is between 1 OZ and 16 OZ, and the second pressure is between 40 PSIG and 200 PSIG. Receiving an additional flash gas having a fifth pressure; and wherein: when operating in the first mode and when the volumetric flow rate of the tank vapors is at a maximum value determined by a supply of tank vapors available from the oil production facility, adding the additional flash gas to the blended gas at a location upstream of the blower at a flow rate required to maintain the specified third pressure at the inlet to the blower; and when operating in the second mode and when the volumetric flow rate of the tank vapors is at the maximum value determined by a supply of tank vapors available from the oil production facility, adding the additional flash gas to the blended gas at a second location downstream of the blower at a flow rate required to maintain the specified generator inlet pressure. The first and second locations downstream of the blower are the same. The fifth pressure is between 5 and 30 PSIG. The specified percentage of the blended gas at which the separator gas is maintained is determined at least in part by a BTU content of the tank vapors and the separator gas and a maximum fuel-gas dew point allowed by the generator. The specified percentage of separator gas in the blended gas is approximately 20%. A BTU content of the fuel-gas blend supplied to the generator is between 900 BTU/SCFD and 2100 BTU/SCFD. A volumetric flow rate of the blended gas supplied to the generator is between 320 MSCFD and 520 MSCFD and the generator generates between 1.5 MW and 2.0 MW of electric power. A volumetric flow rate of the blended gas supplied to the generator is between 120 MSCFD and 170 MSCFD and the generator generates between 0.9 MW and 1.1 MW of electric power. The specified third pressure is between 3 OZ and 4 OZ and the specified fourth pressure is between 10.5 PSIG and 11.5 PSIG.

In general, in another aspect, a fuel-gas blending system comprises: a first inlet for receiving from an oil production facility tank vapors having a first pressure; a second inlet for receiving from the oil production facility separator gas having a second pressure; a plurality of motor-controlled valves for controlling gas flows within the fuel-gas blending system; a variable speed blower having an inlet and an outlet; wherein, the plurality of motor-controlled valves is controlled to: in a first operating mode: blend the tank vapors and the separator gas; supply the blended gas to the inlet of the blower at a specified third pressure that is lower than the first pressure; supply the blended gas from the outlet of the blower to an inlet of a fuel-gas generator; and wherein: a blower motor controller controls a speed of the blower in response to a time-varying fuel-gas demand of the fuel-gas generator such that a specified pressure at the fuel-gas generator inlet is maintained; a volumetric flow rate of the separator gas is controlled such that the separator gas is maintained at a specified percentage of the blended gas; and a volumetric flow rate of the tank vapors is controlled to maintain the specified third pressure at the inlet of the blower; in a second operating mode: supply the tank vapors to the inlet of the blower; blend the separator gas with the tank vapors at a location downstream of the blower; supply the blended gas to the fuel-gas generator; and wherein: the blower motor controller controls the speed of the blower to maintain a specified fourth pressure at the blower outlet; and the volumetric flow rate of the separator gas is controlled to maintain the separator gas at the specified percentage of the blended gas while controlling a volumetric flow rate of the blended gas to maintain the specified generator inlet pressure; operate in the first mode when the received tank vapors are insufficient to maintain the specified third pressure at the blower inlet; and operate in the second mode when the received tank vapor is sufficient to maintain the specified third pressure at the blower inlet.

Various embodiments include one or more of the following features. The first pressure is between 1 OZ and 16 OZ, and the second pressure is between 40 PSIG and 200 PSIG. The system further includes a third inlet for receiving an additional flash gas having a fifth pressure; and wherein the plurality of motor-controlled valves is further controlled to: when the system is operating in the first mode and when the volumetric flow rate of the tank vapors is at a maximum value determined by a supply of tank vapors available from the oil production facility, add the additional flash gas to the blended gas at a location upstream of the blower at a flow rate required to maintain the specified third pressure at the inlet to the blower; and when the system is operating in the second mode and when the volumetric flow rate of the tank vapors is at the maximum value determined by a supply of tank vapors available from the oil production facility, add the additional flash gas to the blended gas at the location downstream of the blower at a flow rate required to maintain the specified generator inlet pressure. The fifth pressure is between 5 and 30 PSIG. The specified percentage of the blended gas at which the separator gas is maintained is determined at least in part by: a BTU content of the tank vapors and the separator gas; and a maximum fuel-gas dew point allowed by the generator. The specified percentage of separator gas in the blended gas is approximately 20%. A BTU content of the fuel-gas blend supplied to the generator is between 900 BTU/SCFD and 2,100 BTU/SCFD. A volumetric flow rate of the blended gas supplied to the generator is between 320 MSCFD and 520 MSCFD and the generator generates between 1.5 MW and 2.0 MW of electric power. A volumetric flow rate of the blended gas supplied to the generator is between 120 MSCFD and 170 MSCFD and the generator generates between 0.9 MW and 1.1 MW of electric power. The specified third pressure is between 3 OZ and 4 OZ and the specified fourth pressure is between 10.5 PSIG and 11.5 PSIG.

DETAILED DESCRIPTION

Figure 1:
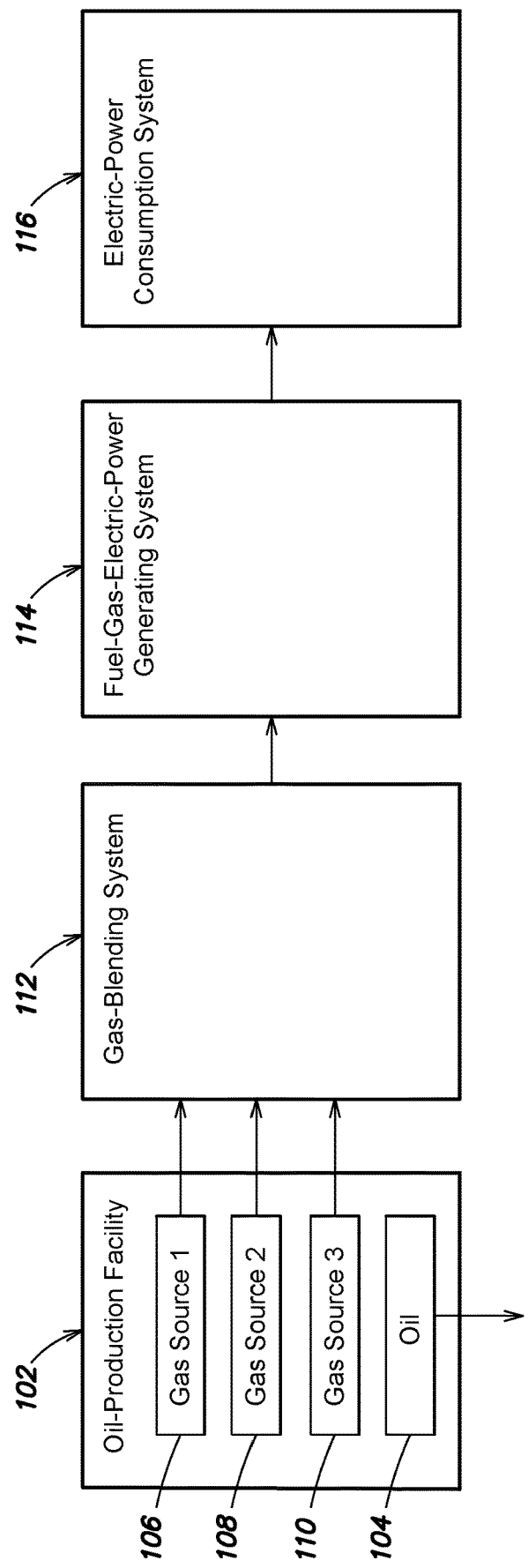
FIG. 1 is a high-level block diagram of a system for using stranded gas to provide a steady supply of suitably conditioned fuel gas to a fuel-gas electric generating system.

Although the primary product of an oil well is the liquid oil, secondary liquids and gases are also produced. Various systems are used in oil production facilities to separate out the oil from the other produced liquids and gases. The gases are referred to as flash gas or flare gas. When it is not always economic to sell the gas, such as when the oil field is remote and lacks pipeline infrastructure, the stranded gas is flared. We describe herein systems and methods for utilizing such stranded gas to supply onsite gas-fueled electricity generators that deliver power to onsite electrically powered systems. FIG. 1 is a high-level block diagram of such a system. Oil-production facility 102 produces oil 104 as well as gases produced by the various stages involved in extracting, separating, and treating the oil. The figure illustrates an example in which the oil-production process produces three gas sources 106, 108, and 110. The gases are supplied to gas-blending system 112, which serves to provide an optimized blend of the supplied gases at a pressure, volume, heating value (BTU content), and dew point required by electric-power-generating system 114. The electrical power generated by generating system 114 is supplied to onsite electric power consumption system 116.

One energy-intensive process that is suitable for the remote locations that are typical of oil production facilities where digital network communication may be limited or absent, is the mining of cryptocurrencies, such as Bitcoin or Altcoins, such as Litecoin, Dogecoin, Dash, Bitcoin Cash, Ethereum, Binance Coin, Tether, Cardano, Solana, XRP, Polkadot, or Shiba Inu. Cryptocurrency mining is performed using high-performance computing systems that have large electric power requirements. The computations involved, though requiring prodigious numbers of CPU cycles, can operate as stand-alone processes since they do not require significant quantities of data input or data output. In certain embodiments, electric-power-generating system 114 is a set of 250-kW Flex Turbines®, available from FlexEnergy® Systems, Inc., of Portsmouth, N.H., and electric-power-consumption system 116 comprises one or more immersion-cooled crypto-mining pods, available from Submer Technologies, S.L., of Barcelona, Spain.

Figure 2:
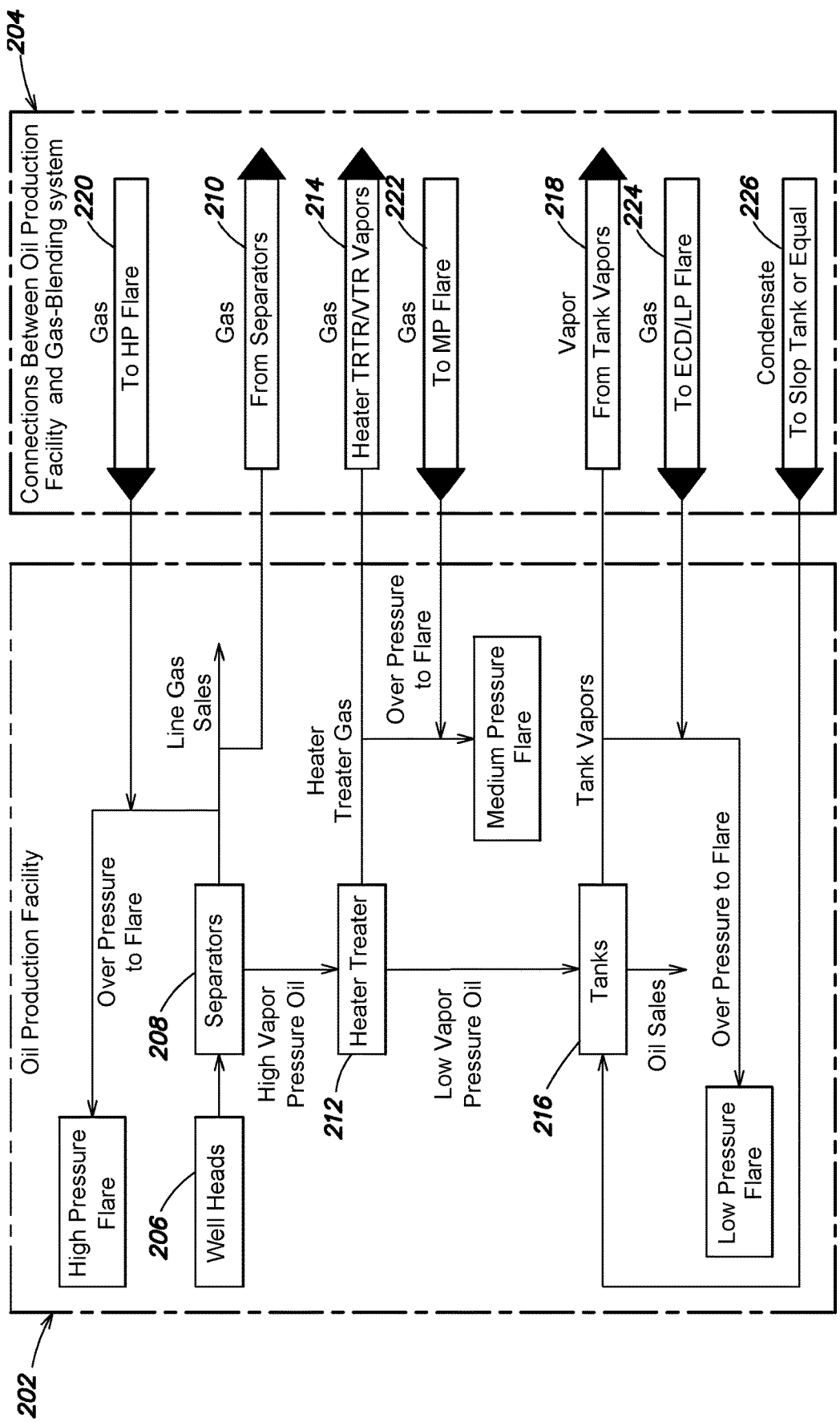
FIG. 2 is a simplified diagram showing the main components of an oil production facility together with the connections between the oil production facility and the described gas-blending system.

FIG. 2 is a simplified diagram showing the main components of oil-production facility 202 and connections 204 between the oil-production facility and gas-blending system 112. Well heads 206 supply a mixture of liquids and gases to separators 208, which comprise pressure vessels used for separating the well stream into gaseous and liquid components. The gases produced by the separator are at high pressure (e.g., 100 PSIG) and are referred to herein as separator gas; such gas is also commonly referred to as line gas. Some of the separator gas is supplied to the gas-blending system via connection 210. In oil-production sites that have the ability to transport the gas away from the oil field, a portion of the gas is sold, with the remainder being flared. In most scenarios, the oil field produces about an order of magnitude more separator gas than is consumed by the gas-blending facility, and thus the majority of the separator gas is sold or flared. For example, the oil field may produce 5-15 million standard cubic feet per day (MMSCFD) of separator gas, while the gas-blending system may only consume 0.6 MMSCFD of separator gas in a system fueling generators that produce up to 2 MW of electric power. High-vapor-pressure oil from separators 208 are routed to heater treater 212, which comprises a separator vessel that uses heat and mechanical separation devices to separate oil-water emulsions to produce dry oil. The heater treater also produces intermediate-pressure gas (e.g., at 20 PSIG), which is supplied to gas-blending system 112 via connection 214. The dry oil from the heater treater is supplied to tanks 216. Low-pressure vapors (e.g., at 0.5 PSIG) form in the tanks, and these are also provided to gas-blending system 112 via connection 218. Tank vapors that cannot be accommodated by the gas-blending system are flared at low pressure. Thus, in the system illustrated in FIG. 2, the oil field supplies three gases to the gas-blending system: high-pressure separator gas, medium-pressure heater treater gas, and low-pressure tank vapors. As indicated in the figure, connections 204 between the oil field and gas-blending system 112 also include return flows of gas to the high-pressure flare 220, gas to the medium-pressure flare 222, and gas to the low-pressure flare 224, as well as condensate 226 to a slop tank or equal.

The volumetric flow rates, pressures and composition of the separator gas, heater treater gas, and tank vapors vary as the flow rate, pressure, and composition of the oil/liquid mix received from the well heads varies. Gas-blending system 112 conditions the gases received from oil-production facility 202 so as to provide a supply of fuel gas to electricity-generating system 114 that satisfies the real-time fuel demands of the generating system.

Figure 3A:
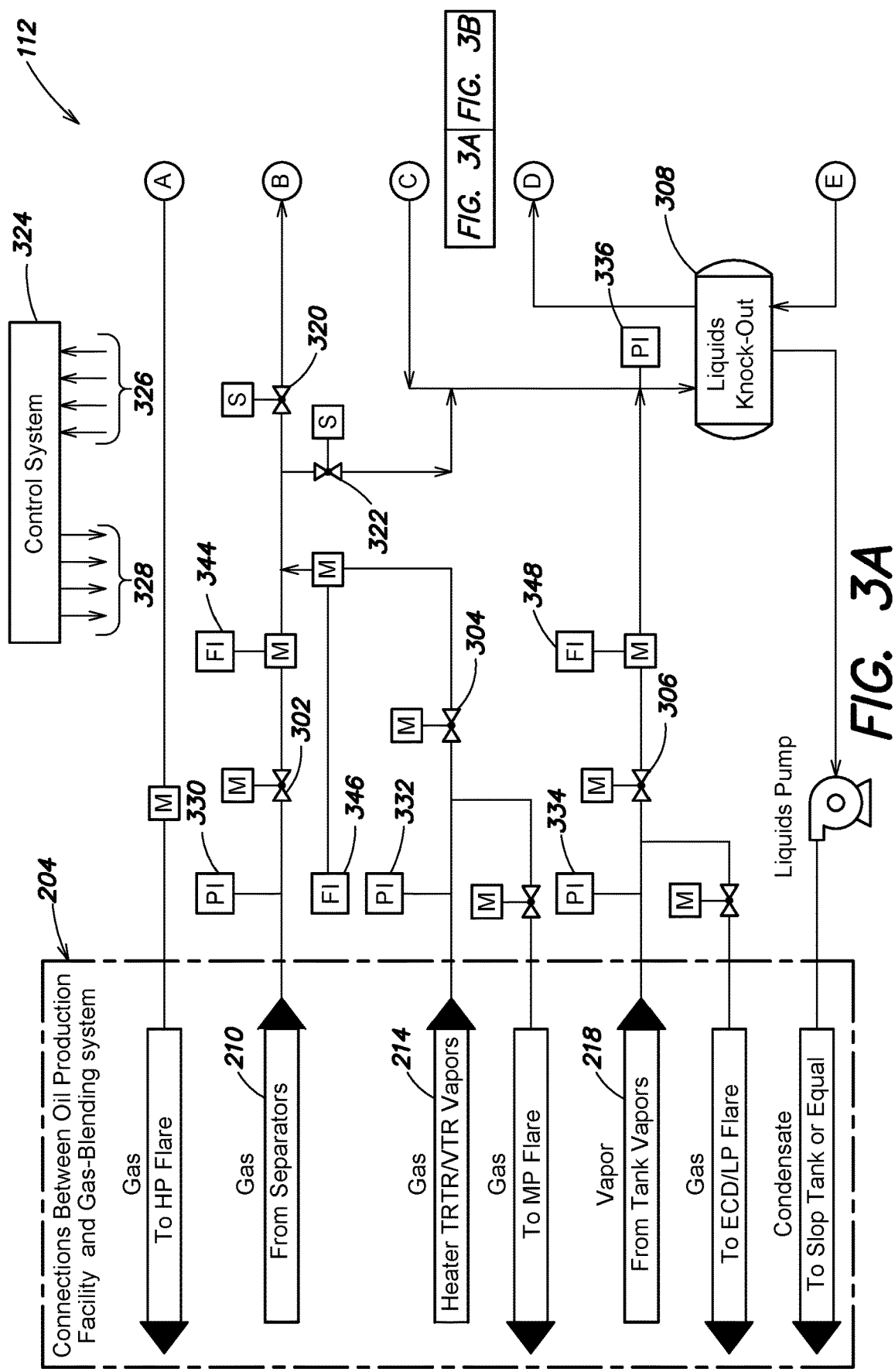
FIGS. 3A and 3B are two parts of a simplified process-flow diagram illustrating components of the described gas-blending system.
Figure 3B:
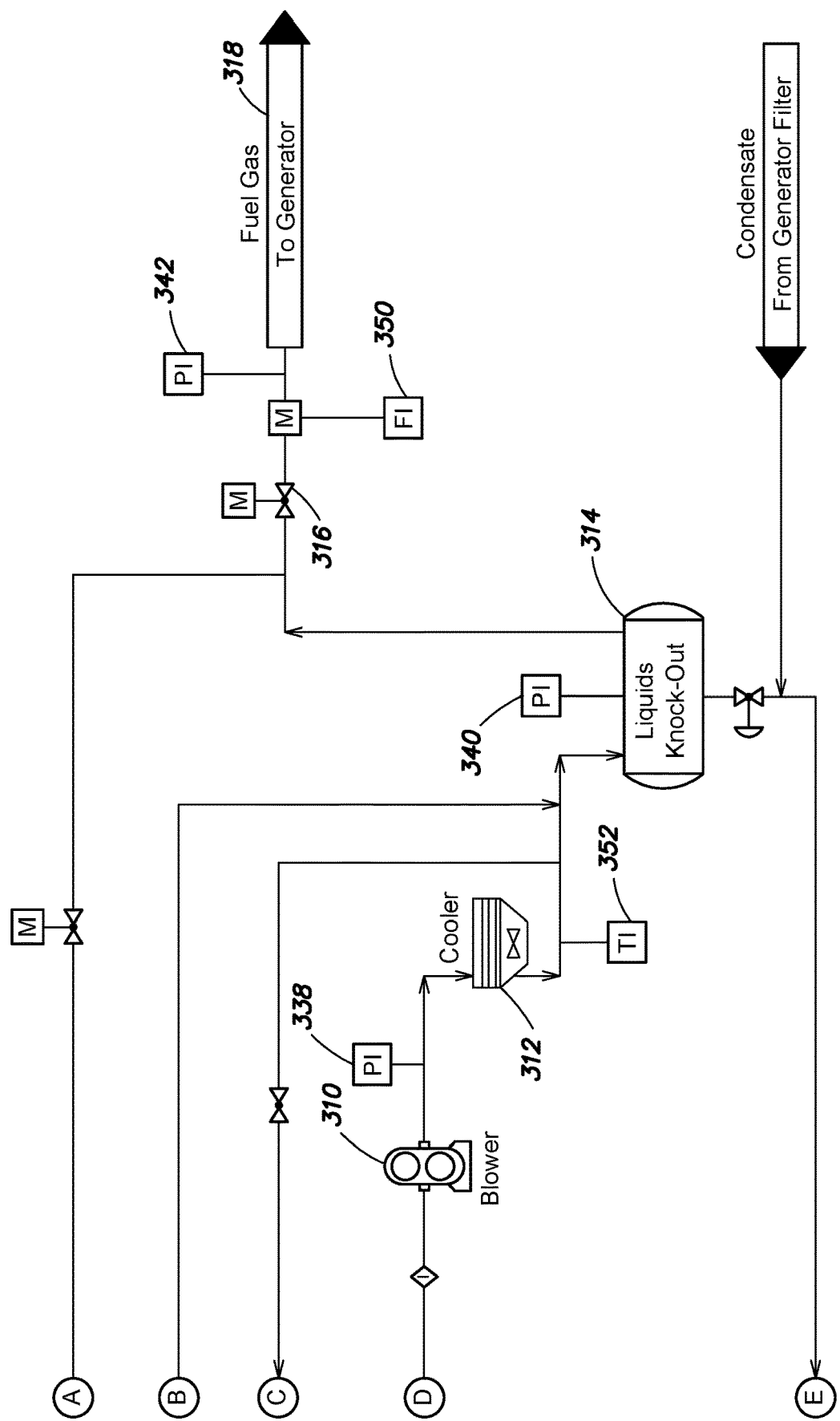

FIGS. 3A and 3B are two parts of a simplified system and process flow diagram illustrating the main components of gas-blending system 112 as well as the connections 204 between the gas-blending system and oil production facility 102. In the described embodiment, the system comprises 6-, 4-, and 2-inch nominal-diameter piping made of ASTM A53 carbon steel material. The system is designed to the ASTM B31.3 code used for process facility piping for fluids under pressure in petroleum refineries, chemical plants, and gas processing plants. The piping runs are bolted together with gasketed, weld-neck flanged connections, and the entire assembly is pressure-tested and leak-tested in accordance with the B31.3 code. The gas flow into the gas-blending system is controlled by control valve styles typical for oil and gas facility applications, such as Emerson Vee-Ball™, which have an internal segmented ball for throttling, and are actuated by Bettis TorqPlus™ Electric actuators. The flow is measured by insertion-probe-style thermal mass flow meters. Major mechanical equipment includes: vessels to catch liquids, which are ASME Section VIII code carbon steel pressure vessels; a rotary-style, positive displacement blower, which is comprised of carbon and stainless-steel internals, a ductile iron body, and has double gas seals to prevent any gas leakage; and a gas cooler with a forced draft, air-finned, carbon steel tubbed design.

In the illustrated embodiment, the system receives fuel gas from three sources—separator gas 210, heater treater gas 214, and tank vapors 218. The nature and number of the gas sources received from the oil production facility may vary from site to site depending on the temperatures and pressures of the facility's separation stages as well as the upstream well fluid compositions. As mentioned above, the tank vapors constitute a low-pressure gas, since they are received at pressures generally lower than 1 PSIG. The other gases are referred to as high-pressure gases, with the heater treater gas in the range of 20 PSIG and the separator gas in the 100 PSIG range.

The gas-blending system has multiple modes of operation. The choice of mode is governed by various factors, such as the availability of the various flash gases from the oil production facility and the status of certain components of the gas-blending system, which is described below. In a first mode, referred to herein as Mode A, all of the fuel gases that are being consumed are routed through blower 310. In certain implementations, the blower is a M-D Pneumatics™ PD Plus® 4012 blower having a minimum operating speed delivering 100 MCSFD. In this mode, motor-operated inlet control valves 302, 304, and 306 control the supply of the separator gas, heater treater gas, and tank vapors, respectively, from the oil production facility to liquids knock-out vessel 308, which in turn feeds gas to the inlet of blower 310. Gas is then fed from the outlet of the blower to cooler 312 and then to liquids knock-out vessel 314. The gas output from knock-out vessel 314 is supplied via motor-operated valve 316 to connection 318 to fuel-gas generator system 114. In a second mode, referred to herein as Mode B, only the low-pressure tank vapors are supplied to the blower inlet, while the high-pressure gases, which comprise one or both of the separator gas and heater treater gas, bypass the blower, and are combined with the tank vapors downstream of the blower before being fed to the generating system. In Mode B, the supply of tank vapors to liquids-knock-out vessel 308 and on to blower 310 continues to be controlled by valve 306. However, the states of valves 320 and 322 are reversed from being open and closed, respectively, in Mode A to being closed and open, respectively, in Mode B. This has the effect of routing the high-pressure gases to a location downstream of blower 310 and cooler, where it is blended with the tank vapors. In certain implementations, the various high-pressure gases may be blended with the low-pressure gas at different locations downstream of the blower (not shown in FIGS. 3A and 3B).

The operation of the gas-blending system is controlled by control system 324, which may be a scalable, low-power digital controller, designed to withstand harsh climates. In certain implementations, the control system is a Fisher™ Remote Operations Controller, available from Emerson Electric, Inc. of St. Louis, Mo. In various implementations, the control system is in data communication with various sensors, meters, and valves of the gas-blending system. Control system inputs 326 and outputs 328 are connected to the various components of the gas-blending system by physical and/or wireless connections, which are omitted from FIGS. 3A and 3B to maintain clarity. Control system 324 receives input data from pressure indicators (PIs) 330, 332, and 334 located at the inlets of the separator gas, heater treater gas, and tank vapors, respectively. As used herein, the term "indicator" may refer to a sensor, which includes both a pressure gauge as well as an electronic element that is able to transmit the measured data to the control system. Similarly, the flow indicators and temperature indicators referred to below may also comprise the corresponding electronic elements and may refer to flow sensors and temperature sensors respectively. Control system 324 also receives pressure data from PI 336 at the inlet of liquids knock-out vessel 308 (which is effectively a measure of the blower inlet or suction pressure), PI 338 at the outlet of the blower, PI 340 at liquids knockout tank 314, and PI 342 measuring the pressure of the fuel gas being supplied to the generator. The control system receives volumetric-flow-rate data from flow-rate indicators 344, 346, and 348, which measure volumetric flow rates of the separator gas, heater treater gas, and tank vapors, respectively. The flow rate of fuel gas to the generator is measured by flow-rate indicator 350, which sends the data to the control system. In addition, the control-system inputs include the positions of valves 302, 304, 306, and 316, and the state of solenoid valves 320 and 322. Further inputs include the speed of blower 310, the motor speed of cooler 312, and the temperature of the cooler discharge from temperature indicator 352.

In various implementations of the system, control system outputs 328 are in data communication with various gas-blending-system components that control the system operation. The outputs include controlling flash-gas-inlet control valves 302, 304, and 306, solenoid valves 320 and 322, motor speed of blower 310, motor speed of cooler 312, and valve 316 controlling the supply of fuel gas to the generating system. The outputs may further control other components, such as flare valves that release gas to flares if fuel-gas pressure exceeds pre-determined limits.

In certain implementations, control system 324 may receive inputs and send control outputs to a subset of the components described above. In such implementations, some of the components may be locally controlled, without communicating with control system 324. For example, temperature indicator 352 at the outlet of cooler 312 may output its temperature reading directly to cooler 312, which may adjust its motor speed in order to maintain a pre-specified temperature value at indicator 352.

During normal operation, the gas-blending system is designed and controlled to meet the fuel-gas requirements of the generating system while being subject to various operating constraints. The principal fuel-gas requirement of the generating system is to receive at its inlet a constant-pressure supply of fuel gas having a BTU content that supplies the energy needed to generate the specified electric power output. An additional requirement is that the dew point of the received fuel-gas blend does not exceed a predetermined value, so as to preclude the risk of unwanted liquids forming within the generating system.

The following are examples of fuel flow demand corresponding to certain power generation setpoints. For a combination of generators producing 1.5 MW to 2.0 MW of electrical power, the generators are supplied with approximately 320 MSCFD to 520 MSCFD of fuel gas at the maximum BTU blend for the generator, which depends on the specific generator combination, the ambient temperature, and elevation. The system is also able to operate at a lower fuel supply rate to generate between 0.9 and 1.1 MW power. In such a low-power scenario, the generator is supplied with between 120 MSCFD to 170 MSCFD of fuel gas, though the flow rates may vary depending on the specific combination of generators deployed, the ambient temperature, and elevation.

Low-pressure gases are difficult to utilize without first raising their pressure with energy-consuming compressors. Furthermore, the availability of tank vapors in a typical oil-production facility is highly variable, as it depends on the supply of oil to the tank from batch processing in upstream processes, such as the heater treater separation process. The result has been that tank vapors have hitherto been largely wasted, i.e., flared. The gas-blending system described herein is therefore operated in a manner that attempts to maximize the use of the low-pressure tank vapors. The high-pressure gases may also be used when there are insufficient tank vapors, and to maintain the dew point of the fuel gas supplied to the generator within the required range.

As mentioned above, the generator requires the incoming fuel gas to have a BTU content that falls within a specific range. For a range of implementations of the described system, the fuel-gas generators are able to receive a fuel-gas blend having a heating value between 900 BTU/MSCFD and 2,100 BTU/MSCFD. In some implementations, the BTU content is required to be in the 1,400-1,600 range. The top of this range is partially determined by a maximum allowed dew-point requirement for the incoming fuel-gas blend, which implies a maximum BTU content of the blend, since the higher the BTU content, the heavier molecular weight of the hydrocarbons in the gas, and the higher the dew point. The bottom of the acceptable fuel gas heating value range is determined by various generator size factors such as the range of the generator's fuel to air controls, nozzles, and minimum combustion energy requirements. Tank vapors have the highest BTU content of the supplied flash gases, generally being in the range 2000-2500 BTU, while line gas has the lowest BTU content, generally being in the range 1300-1600 BTU, and heater treater gas has an intermediate BTU content of 1600-1900 BTUs. Since the tank-vapor BTU content is in excess of what the generator can process, some of the lower-BTU gasses from high-pressure sources are fed into the blend. In the described embodiment, the volumetric flow rate of the heater treater gas is controlled at a fixed percentage, e.g., 20%, of the total fuel-gas blend reaching the generator inlet. The proportion of high-pressure gases may be varied as the BTU content of the various flash gases varies. In general, the system maximizes the use of available tank vapors by feeding in high-pressure gases only when they are needed to control the maximum BTU content of the fuel-gas blend and to maintain overall flow requirements.

We now describe how the gas-blending system is operated in order to satisfy the demands of the fuel-gas generating system, while maximizing the use of tank vapors. The operation involves the use of operating Modes A and B and logic for switching modes.

In Mode A, all gases are directed to blower 310 inlet via knock-out tank 308 by closing valve 320 and opening valve 322. Blower 310 has a minimum required inlet pressure, e.g., 3 OZ, and therefore pressure-control valves 302, 304, and 306 are throttled so as to maintain a constant blower inlet pressure at a value that is within a safe margin of the minimum value, e.g., 4 OZ, while maximizing the use of available tank vapors. This is achieved by split-range control as follows: Control valve 306 for tank vapors throttles to achieve the required inlet pressure, e.g., 4 OZ, at PI 336. If the valve is 100% open to achieve the 4 OZ pressure setpoint, heater treater control valve 304 is permitted to open, while tank-vapor control valve 306 remains 100% open. If heater treater control valve 304 becomes closed, control valve 306 resumes throttling to maintain the required pressure at PI 336. When tank-vapor valve 306 is 100% open, heater treater control valve 304 throttles to maintain the required pressure at PI 336. Meanwhile, separator-gas control valve 302 throttles to maintain a specified percentage, e.g., 20%, of the total fuel gas blend flowing into the generator inlet. Thus, the separator gas flow rate (as measured at indicator 344) is maintained at the specified percentage of the total of separator gas flow rate (as measured at flow rate indicator 344) plus heater treater gas flow rate (as measured at flow rate indicator 346), plus tank vapor flow rate (as measured at flow rate indicator 348). When both heater treater control valve 304 and tank vapor control valve 306 are closed, separator gas control valve 302 throttles to maintain the required blower inlet pressure at PI

336. When both heater treater control valve 304 and tank vapor control valve 306 are 100% open, separator gas valve 302 throttles to maintain the required blower inlet pressure 336. The motor for blower 310 is controlled by a variable speed controller that adjusts the blower motor speed to maintain a specified pressure, e.g., 10 PSIG, at knock-out tank 314 as measured by PI 340. The motor for cooler 312 is controlled by a variable speed controller that adjusts the cooler motor speed to maintain a specified temperature, e.g., 100° F., as measured by temperature indicator 352. Control valve 316 for the fuel gas supplied to the generator is throttled to achieve a specified pressure in accordance with generator requirements, e.g., 8 PSIG, as measured by PI 342.

To summarize the system's operation in Mode A, the fuel-gas supply requirements of the generator are met by using tank vapors and separator gas, as well as, in some circumstances, heater treater gas. The heater treater gas, and/or any other flash gas sources, are used to maintain the minimum pressure requirement at the blower inlet when tank vapors are being fully utilized. The gases are blended upstream of the blower, with the blend having a controlled percentage of separator gas in order to control the blended gas BTU content and hence the blend's hydrocarbon dew point. The blend is supplied to the blower, which feeds the gas to the generator inlet via the cooler and a liquids knock-out tank. As the BTU content of the fuel gas reaching the generator varies, the generator demand for gas varies. The fuel-gas-blending system maintains a constant generator inlet pressure by throttling valve 316, controlling the blower speed to make up pressure to that valve inlet, and in turn responsively controlling the incoming flash gas flow valves to maintain the minimum required blower inlet pressure.

In Mode B, the high-pressure gases bypass the blower and are routed to knock-out vessel 314, where they are blended with tank vapors fed to the knock-out vessel by the blower. To enter this mode, valve 322 is closed and valve 320 is opened. While operating in Mode B, tank-vapor control valve 306 throttles to maintain the required blower inlet pressure 336 and the blower speed fluctuates to maintain a pressure set point immediately downstream of the blower, e.g., 11 PSIG at 338. When valve 306 is 100% open, heater treater control valve 304 is permitted to open. This valve throttles to maintain a pressure setpoint at PI 340, e.g., 10 PSIG, in the 314 liquids knock out vessel downstream of the blower cooler, while the blower speed varies to maintain a slightly higher pressure setpoint immediately downstream of the blower at PI 338, e.g., 11 PSIG. When there is a relatively steady fuel demand from the generator, there is a relatively steady flowing pressure drop between the blower outlet and the downstream liquids knockout vessel. The blower speed fluctuates to maximize the use of fluctuating tank vapors by maintaining a pressure setpoint immediately downstream of the blower, while the other gas sources that bypass the blower make up a slightly lower pressure setpoint at the 314 knockout vessel downstream of the blower cooler. IN normal operation, the separator-gas control valve 302 is programmed to throttle to maintain a specified percentage, e.g., 20%, of the total fuel gas blend flowing into the generator inlet.

The following are exemplary Mode B scenarios. If heater treater control valve 304 is closed (e.g., enough tank vapor flow is available to steadily supply the required 80% of the total fuel gas flow requirement), control valve 306 resumes throttling to maintain the required pressure at PI 336 at the blower suction, while valve 302 maintains the total blend of separator gas at 20%. If a heater treater gas source is not available, and the pressure downstream of the blower cannot be maintained due to insufficient tank vapor contribution, separator gas valve 302 switches from maintaining a blend of 20% to throttling to maintain a specified pressure, e.g., 10 PSIG, at knockout tank 314 as measured by PI 340. Alternatively, if heater treater gas is available, and valve 304 is 100% open, and the pressure set point at 314 (PI 340) still cannot be maintained, separator-gas valve 302 will again switch from blend control to throttling to maintain the specified pressure at knockout tank 314. As in Mode A, the motor for cooler 312 is controlled to maintain a specified temperature, e.g., 100° F., as measured by temperature indicator 352. And also as in Mode A, generator-inlet control valve 316 is throttled to achieve the specified pressure in accordance with generator requirements, e.g., 8 PSIG, as measured by PI 342.

In summary, in Mode B, the generator is supplied fuel gas by tank vapors via the blower and by one or more higher pressure gases fed directly to the generator inlet knockout tank. A steady generator inlet pressure is achieved by control valve 316, then making up pressure to the inlet of that valve by controlling the blower speed to maintain a constant blower outlet pressure (while the tank vapor control valve throttles to maintain the specified blower inlet pressure); and, when the tank-vapor control valve is fully open, feeding one or more of the high-pressure gases to the secondary knockout vessel downstream of the blower and cooler while the generator fuel-gas valve throttles to maintain a constant fuel-gas inlet pressure to the generator. The controls are configured to allow multiple secondary gas sources, such as heater treater gas, into the system once the use of tank vapors is maximized. The separator gas is configured to blend into the gas streams at a pre-set percentage, e.g., 20%, of the total flow reaching the generator inlet.

The gas-blending system may also include additional gas coolers, gas-scrubbing vessels, and drain pumps. Other functions performed by the gas-blending system may include the operation of gas-scrubbing vessels, drain valves, and control of low-pressure, medium-pressure, and high-pressure flares. If any one of the gas sources produces abnormally high operating pressures, it is relieved to the appropriate flare.

The operating mode of the gas-blending system may be controlled manually or automatically by control system 324. Mode A is preferred when tank vapors on their own are insufficient or too unstable to maintain the minimum pressure required at the blower inlet since the tank vapors can be supplemented by higher pressure gases (i.e., separator gas and heater treater gas), enabling the system to continue operating while using the available tank vapors. This would not be possible in Mode B, as the higher pressure gases are routed downstream of the blower. On the other hand, Mode B may be preferred when there are sufficient tank vapors to satisfy the minimum blower-inlet pressure requirements because Mode B is more energy-efficient than Mode A. In Mode B, high-pressure gases are fed directly into the knockout vessel downstream of the blower, which obviates the need to reduce their pressure (e.g., to 4 OZ) and then consume energy when powering the blower to increase their pressure again (e.g., to 11 PSIG).

The gas-blending system attempts to accommodate the highly variable supply of tank vapors by switching operating modes. For example, when operating in Mode B with the tank-vapor control valve fully open, if the tank vapors cannot provide enough gas to maintain the minimum blower inlet pressure, thus causing the blower speed to approach its minimum speed, the system may be switched (manually or automatically) from Mode B to Mode A. As described above, Mode A permits the continued operation of the gas-blending system when tank vapors alone cannot meet the minimum pressure requirements at the blower inlet. Modes may also be switched when equipment fails, or an abnormal operating condition prevails. For example, if the blower fails, the system may switch from Mode A to Mode B so as to operate, at least temporally, with high-pressure gases that bypass the blower to supply the generator.

When the system starts up, the sufficiency of the tank vapor supply, both in terms of volumetric flow rate available and variability, may not be known. These conditions favor Mode A operation upon start-up. Thus, the system may be programmed to start up in Mode A and switch to Mode B once the sufficiency of the tank vapor supply has been proven. For example, after a steady state has been achieved in Mode A, the general contribution of tank vapors has been established, and the pressure drop between the blower outlet and knock-out tank 314 inlet has been observed, the system may then be switched to the more efficient Mode B. In certain implementations, the system operates in Mode A all the time, switching to Mode B only when the blower is out of service. When the blower becomes available again, the system reverts to Mode A.

The various components of control system 324 and other controllers, such as programmable logic controllers of gas-blending system 112, as well onsite digital computing systems that consume the power produced by the generating system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, video projection systems and other video output devices, loudspeakers, headphones and other audio output devices, printers, devices for communicating over a low or high bandwidth network, including network interface devices, cable modems, and storage devices such as disk, tape, or solid-state media including flash memory. One or more input devices may be connected to the computer system. Example input devices include, but are not limited to, a keyboard, keypad, mouse, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The wide area network may be implemented via land-based physical connections, or via wireless connections, such as cellular networks, point-to-point microwave links or satellite networks. The connected network may transfer to and from the computer system program instructions for execution on the computer, system control logic programs, media data such as video data, still image data, or audio data, metadata, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by a microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The system control logic may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of supplying fuel gas to a fuel-gas-powered generator, the fuel gas comprising a blend of flash gases produced by an oil production facility, the method comprising:
   receiving from the oil production facility:
      tank vapors having a first pressure; and
      separator gas having a second pressure, wherein the second pressure is greater than the first pressure; and
   in a first mode:
      blending the tank vapors and the separator gas;
      supplying the blended gas to an inlet of a blower at a specified third pressure that is lower than the first pressure;
      supplying the blended gas from an outlet of the blower to an inlet of the generator; and wherein:
         a speed of the blower is responsive to a time-varying fuel-gas demand of the generator such that a specified pressure at the inlet of the generator inlet is maintained;

a volumetric flow rate of the separator gas is controlled to maintain the separator gas at a specified percentage of the blended gas; and
a volumetric flow rate of the tank vapors is controlled to maintain the specified third pressure at the inlet of the blower;
in a second mode:
supplying the tank vapors to the inlet of the blower;
blending the separator gas with the tank vapors at a first location downstream of the blower;
supplying the blended gas to the inlet of the generator; and wherein:
the speed of the blower is controlled to maintain a specified fourth pressure at the output of the blower; and
the volumetric flow rate of the separator gas is controlled to maintain the separator gas at the specified percentage of the blended gas while controlling a volumetric flow rate of the blended gas to maintain the specified generator inlet pressure;
operating in the first mode when the received tank vapors are insufficient to maintain the specified third pressure at the inlet to the blower; and
operating in the second mode when the received tank vapor is sufficient to maintain the specified third pressure at the inlet to the blower.

2. The method of claim 1, wherein the first pressure is between 1 OZ and 16 OZ, and the second pressure is between 40 PSIG and 200 PSIG.

3. The method of claim 1, further comprising:
receiving an additional flash gas having a fifth pressure; and
wherein:
when operating in the first mode and when the volumetric flow rate of the tank vapors is at a maximum value determined by a supply of tank vapors available from the oil production facility, adding the additional flash gas to the blended gas at a location upstream of the blower at a flow rate required to maintain the specified third pressure at the inlet to the blower; and
when operating in the second mode and when the volumetric flow rate of the tank vapors is at the maximum value determined by a supply of tank vapors available from the oil production facility, adding the additional flash gas to the blended gas at a second location downstream of the blower at a flow rate required to maintain the specified generator inlet pressure.

4. The method of claim 3, wherein the first and second locations downstream of the blower are the same.

5. The method of claim 3, wherein the fifth pressure is between 5 and 30 PSIG.

6. The method of claim 1, wherein the specified percentage of the blended gas at which the separator gas is maintained is determined at least in part by:
a BTU content of the tank vapors and the separator gas; and
a maximum fuel-gas dew point allowed by the generator.

7. The method of claim 1, wherein the specified percentage of separator gas in the blended gas is approximately 20%.

8. The method of claim 1, wherein a BTU content of the fuel-gas blend supplied to the generator is between 900 BTU/SCFD and 2100 BTU/SCFD.

9. The method of claim 1, wherein a volumetric flow rate of the blended gas supplied to the generator is between 320 MSCFD and 520 MSCFD and the generator generates between 1.5 MW and 2.0 MW of electric power.

10. The method of claim 1, wherein a volumetric flow rate of the blended gas supplied to the generator is between 120 MSCFD and 170 MSCFD and the generator generates between 0.9 MW and 1.1 MW of electric power.

11. The method of claim 1, wherein the specified third pressure is between 3 OZ and 4 OZ and the specified fourth pressure is between 10.5 PSIG and 11.5 PSIG.

12. A fuel-gas blending system comprising:
a first inlet for receiving from an oil production facility tank vapors having a first pressure;
a second inlet for receiving from the oil production facility separator gas having a second pressure;
a plurality of motor-controlled valves for controlling gas flows within the fuel-gas blending system;
a variable speed blower having an inlet and an outlet;
wherein, the plurality of motor-controlled valves is controlled to:
in a first operating mode:
blend the tank vapors and the separator gas;
supply the blended gas to the inlet of the blower at a specified third pressure that is lower than the first pressure;
supply the blended gas from the outlet of the blower to an inlet of a fuel-gas generator; and wherein:
a blower motor controller controls a speed of the blower in response to a time-varying fuel-gas demand of the fuel-gas generator such that a specified pressure at the fuel-gas generator inlet is maintained;
a volumetric flow rate of the separator gas is controlled such that the separator gas is maintained at a specified percentage of the blended gas; and
a volumetric flow rate of the tank vapors is controlled to maintain the specified third pressure at the inlet of the blower;
in a second operating mode:
supply the tank vapors to the inlet of the blower;
blend the separator gas with the tank vapors at a location downstream of the blower;
supply the blended gas to the fuel-gas generator; and wherein:
the blower motor controller controls the speed of the blower to maintain a specified fourth pressure at the blower outlet; and
the volumetric flow rate of the separator gas is controlled to maintain the separator gas at the specified percentage of the blended gas while controlling a volumetric flow rate of the blended gas to maintain the specified generator inlet pressure;
operate in the first mode when the received tank vapors are insufficient to maintain the specified third pressure at the blower inlet; and
operate in the second mode when the received tank vapor is sufficient to maintain the specified third pressure at the blower inlet.

13. The system of claim 12, wherein the first pressure is between 1 OZ and 16 OZ, and the second pressure is between 40 PSIG and 200 PSIG.

14. The system of 12, further comprising:
a third inlet for receiving an additional flash gas having a fifth pressure; and wherein the plurality of motor-controlled valves is further controlled to:
  when the system is operating in the first mode and when the volumetric flow rate of the tank vapors is at a maximum value determined by a supply of tank vapors available from the oil production facility, add the additional flash gas to the blended gas at a location upstream of the blower at a flow rate required to maintain the specified third pressure at the inlet to the blower; and
  when the system is operating in the second mode and when the volumetric flow rate of the tank vapors is at the maximum value determined by a supply of tank vapors available from the oil production facility, add the additional flash gas to the blended gas at the location downstream of the blower at a flow rate required to maintain the specified generator inlet pressure.

15. The system of claim 14, wherein the fifth pressure is between 5 and 30 PSIG.

16. The system of claim 12, wherein the specified percentage of the blended gas at which the separator gas is maintained is determined at least in part by:
  a BTU content of the tank vapors and the separator gas; and
  a maximum fuel-gas dew point allowed by the generator.

17. The system of claim 12, wherein the specified percentage of separator gas in the blended gas is approximately 20%.

18. The system of claim 12, wherein a BTU content of the fuel-gas blend supplied to the generator is between 900 BTU/SCFD and 2,100 BTU/SCFD.

19. The system of claim 12, wherein a volumetric flow rate of the blended gas supplied to the generator is between 320 MSCFD and 520 MSCFD and the generator generates between 1.5 MW and 2.0 MW of electric power.

20. The system of claim 12, wherein a volumetric flow rate of the blended gas supplied to the generator is between 120 MSCFD and 170 MSCFD and the generator generates between 0.9 MW and 1.1 MW of electric power.

21. The system of claim 12, wherein the specified third pressure is between 3 OZ and 4 OZ and the specified fourth pressure is between 10.5 PSIG and 11.5 PSIG.

* * * * *